United States Patent
Zhang et al.

(10) Patent No.: US 11,210,801 B1
(45) Date of Patent: Dec. 28, 2021

(54) ADAPTIVE MULTI-SENSOR DATA FUSION METHOD AND SYSTEM BASED ON MUTUAL INFORMATION

(71) Applicant: Tsinghua University, Beijing (CN)

(72) Inventors: Xinyu Zhang, Beijing (CN); Jun Li, Beijing (CN); Zhiwei Li, Beijing (CN); Zhenhong Zou, Beijing (CN); Li Wang, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 0 days.

(21) Appl. No.: 17/402,494

(22) Filed: Aug. 13, 2021

(30) Foreign Application Priority Data

Oct. 26, 2020 (CN) .......................... 202011156482.1

(51) Int. Cl.
*G06K 9/00* (2006.01)
*G06T 7/521* (2017.01)
(Continued)

(52) U.S. Cl.
CPC ............ *G06T 7/521* (2017.01); *G06K 9/6226* (2013.01); *G06T 5/50* (2013.01);
(Continued)

(58) Field of Classification Search
CPC . G06T 7/521; G06T 5/50; G06T 2207/10024; G06T 2207/10028; G06T 2207/20076; G06K 9/6226
See application file for complete search history.

(56) References Cited

U.S. PATENT DOCUMENTS

| 8,099,213 B2 * | 1/2012 | Zhang | G01S 7/4802 |
| | | | 701/41 |
| 8,886,387 B1 * | 11/2014 | Agarwal | G06K 9/00791 |
| | | | 701/28 |
| 2017/0213149 A1 * | 7/2017 | Micks | G06K 9/00805 |

FOREIGN PATENT DOCUMENTS

| CN | 108171141 A | 6/2018 |
| CN | 108665541 A | 10/2018 |

(Continued)

OTHER PUBLICATIONS

Duo Zhang, et al., Mutual-information based weighted fusion for target tracking in underwater wireless sensor networks. Frontiers of Information Technology & Electronic Engineering, 2018, pp. 544-556, 19(4).

*Primary Examiner* — Gregory M Desire
(74) *Attorney, Agent, or Firm* — Bayramoglu Law Offices LLC

(57) ABSTRACT

An adaptive multi-sensor data fusion method based on mutual information includes: receiving an RGB image of a road surface collected by a camera; receiving point cloud data of the road surface collected synchronously by LIDAR; preprocessing the point cloud data to obtain dense point cloud data; and inputting the RGB image and the dense point cloud data into a pre-established and well-trained fusion network, to output data fusion results. The fusion network is configured to calculate mutual information of a feature tensor and an expected feature of input data, assign fusion weights of the input data according to the mutual information, and then output the data fusion results according to the fusion weights. In the new method, such information theory tool as mutual information is introduced, to calculate the correlation between the extracted feature of the input data and the expected feature of the fusion network.

7 Claims, 3 Drawing Sheets

(51) Int. Cl.
  *G06T 5/50* (2006.01)
  *G06K 9/62* (2006.01)
(52) U.S. Cl.
  CPC .............. *G06T 2207/10024* (2013.01); *G06T 2207/10028* (2013.01); *G06T 2207/20076* (2013.01)

(56) References Cited

FOREIGN PATENT DOCUMENTS

| | | |
|---|---|---|
| CN | 110378196 A | 10/2019 |
| CN | 110533695 A | 12/2019 |
| CN | 110765894 A | 2/2020 |
| CN | 111553859 A | 8/2020 |

* cited by examiner

ADAPTIVE MULTI-SENSOR DATA FUSION METHOD AND SYSTEM BASED ON MUTUAL INFORMATION

CROSS REFERENCE TO THE RELATED APPLICATIONS

This application is based upon and claims priority to Chinese Patent Application No. 202011156482.1, filed on Oct. 26, 2020, the entire contents of which are incorporated herein by reference.

TECHNICAL FIELD

The present invention belongs to the technical field of intelligent driving, in particular to an adaptive multi-sensor data fusion method and system based on mutual information.

BACKGROUND

Intelligent driving vehicles need to sense and measure the surrounding environment through multiple sensors to ensure safe driving. Fusion networks can fuse data from different sensors to complete driving tasks, including lane line detection, object detection and tracking, etc. However, data from different sensors may have multiple problems. For example, cameras may have such problems as image overexposure, rain and fog weather effects, and obstacle occlusion, and LIDAR may have such problems as too sparse point clouds and long distances from the target. To address these problems, mutual information calculation can be used to assess the data quality, fusion weights can be assigned to weight and use the valid information, to reduce the impact of invalid data on the fusion network, and improve the network performance.

The existing methods for calculating multi-sensor data fusion weights are less involved in the field of information theory, and the existing methods mainly include: 1) no data quality assessment is performed and fixed weights are used, 2) different sensor data are compared, and data with possible problems are not involved in fusion, and 3) data fusion weights are calculated using an evidence theory. However, they are either insufficiently adaptive to the data or complicated in calculation. The introduction of mutual information overcomes some difficulties of the existing methods; 1) reasonable quantification tools and support from mathematical methods are lacked; 2) the problem of network non-convergence easily exists during the training process; 3) the fusion weights cannot adaptively adjust the inputs of different sensors, i.e., adjustment cannot be performed according to the data quality and information amount.

SUMMARY

The objective of the present invention is to overcome the defects of the prior art and provide an adaptive multi-sensor data fusion method and system based on mutual information, which can be applied to the field related to automatic driving such as lane line detection.

To achieve the above objective, the present invention provides an adaptive multi-sensor data fusion method based on mutual information, including:

receiving an RGB image of a road surface collected by a camera;

receiving point cloud data of the road surface collected synchronously by LIDAR;

preprocessing the point cloud data to obtain dense point cloud data; and inputting the RGB image and the dense point cloud data into a pre-established and well-trained fusion network, to output data fusion results;

the fusion network is configured to calculate the mutual information of the feature tensor and the expected feature of the input data, assign fusion weights of the input data according to the mutual information, and then output data fusion results according to the fusion weights.

As an improvement of the above method, the preprocessing the point cloud data to obtain dense point cloud data specifically includes:

projecting the point cloud data onto the pixel plane using the conversion matrix of the LIDAR coordinate system and the camera imaging coordinate system, to obtain the two-dimensional point cloud data corresponding to the grayscale image; and performing interpolation operation on the two-dimensional point cloud data to obtain dense point cloud data.

As an improvement of the above method, the fusion network includes a mutual information calculating module, and the mutual information calculating module is specifically implemented as follows:

calculating the mutual information $I(X;Y)$ according to random variables X and Y:

$$I(X;Y) = \sum_{x \in X} \sum_{y \in Y} p(x, y) \log \frac{p(x, y)}{p(x)p(y)}$$

wherein $p(x,y)$ is the joint probability density function of the random variables X and Y, $p(x)$ is the marginal probability density function of the random variable X, and $p(y)$ is the marginal probability density function of the random variable Y;

the mutual information $I(X;Y)$ is represented in the form of KL divergence:

$$I(X;Y) = D_{KL}(P_{XY} \| P_X \otimes P_Y)$$

wherein, $$D_{KL}(P_{XY} \| P_X \otimes P_Y) := E_{P_{XY}}\left[\log \frac{dP_{XY}}{d(P_X \otimes P_Y)}\right]$$

wherein $D_{KL}(\bullet)$ represents the KL divergence of the mutual information, $P_X$ is the probability of the random variable X, $P_Y$ is the probability of the random variable Y, $P_{XY}$ is the joint probability of the random variables X and Y, and $E_{P_{XY}}$ represents the expected value of $P_{XY}$;

$P_{XT}$ is recorded as J, and $P_X \otimes P_Y$ is recorded as M;

the lower limit $\hat{I}$ of mutual information is obtained according to the form and nature of the DV distribution of KL divergence:

$$I(X;Y) \geq \hat{I}(X;Y) = E_J[T_\omega(x,y)] - \log E_M[e^{T_\omega(x,y)}]$$

wherein, $T_\omega : x \times y \to R$ is the function containing parameter $\omega$, $E_J$ represents the expected value of $T_\omega(x,y)$, $E_M$ represents the expected value of $e^{T_\omega(x,y)}$, the lower limit $\hat{I}$ of mutual information calculated from the function is close enough to the actual value, and the function is specifically realized as follows:

the form of the feature tensor $X_1$ of the first branch is (C, $H_1, M_1, N_1$), wherein C is the number of channels of the first branch, $(H_1, M_1, N_1)$ represents C feature maps and is recorded as $X_{1,n}$, n=1, ..., C, n is a certain channel of the first branch, and the lower limit $\hat{I}(X_{1,n};Y)$ of mutual information of the first branch is obtained as follows through the calculating formula of the lower limit $\hat{I}$ of mutual information:

$$\hat{I}(X_{1,n}; Y) = \log(\Sigma S_1 e^{u_{1,n}-u_{1,max}}) + u_{1,max} - \log(\Sigma S_1) - \frac{\Sigma(u_{1,avg} \cdot S_1)}{\Sigma S_1}$$

wherein $S_1 = 1 - \overline{S_1}$, $\overline{S_1}$ is a diagonal matrix of $H_1 \cdot H_1$, the matrix $U_1 = X_{1,n} \cdot Y$, $u_{1,n}$ is an element in $U_1$, $u_{1,max}$ is the maximum value of each element in $U_1$, $u_{1,avg}$ is an average value of each element in $U_1$, therefore, the mutual information $I(X_1;Y)$ of the first branch is obtained:

$$I(X_1; Y) = \frac{1}{C}\sum_{n=1}^{C} I(X_{1,n}; Y);$$

the form of the feature tensor $X_2$ of the second branch is $(D, H_2, M_2, N_2)$, wherein D is the number of channels of the second branch, $(H_2, M_2, N_2)$ represents D feature maps and is recorded as $X_{2,m}$, m=1, ..., D, m is a certain channel of the second branch, and the lower limit $\hat{I}(X_{2,m};Y)$ of mutual information of the second branch is obtained as follows through the calculating formula of the lower limit $\hat{I}$ of mutual information:

$$\hat{I}(X_{2,m}; Y) = \log(\Sigma S_2 e^{u_{2,m}-u_{2,max}}) + u_{2,max} - \log(\Sigma S_2) - \frac{\Sigma(u_{2,avg} \cdot S_2)}{\Sigma S_2}$$

wherein $S_2 = 1 - \overline{S_2}$, $\overline{S_2}$ is a diagonal matrix of $H_2 \cdot H_2$, the matrix $U_2 = X_{2,m} \cdot Y$, $u_{2,m}$ is an element in $U_2$, $u_{2,max}$ is the maximum value of each element in $U_2$, $u_{2,avg}$ is an average value of each element in $U_2$, therefore, the mutual information $I(X_2;Y)$ of the second branch is obtained.

$$I(X_2; Y) = \frac{1}{D}\sum_{m=1}^{D} I(X_{2,m}; Y).$$

As an improvement of the above method, the method further includes a training step of fusion network, specifically including:

step 1) taking the well-marked RGB image and dense point cloud data as a training set;

step 2) setting an initial fusion weight to 1:1;

step 3) inputting the RGB image and dense point cloud data in the training set into a fusion network, after p rounds of training, determining hyperparameters of the fusion network, and obtaining feature tensors and expected features of two branches; and calculating mutual information with a mutual information calculating module and assigning fusion weights;

step 4) calculating the difference between the assigned fusion weight and the initial weight, if the difference is smaller than a threshold value, then the assigned fusion weight converges, and the training of the fusion network is completed, otherwise, turning to step 5); and step 5) with q rounds as a training period, in each round, selecting the RGB image and dense point cloud data in the training set and inputting into the fusion network, and adjusting the hyperparameters of the fusion network; in the q-th round, calculating mutual information by the mutual information calculating module according to the feature tensor and expected feature, and assigning fusion weight; and turning to step 4).

As an improvement of the above method, before inputting the RGB image and the dense point cloud data into a pre-established and well-trained fusion network to output data fusion results, the method further includes: judging whether the current frame of RGB image and the previous frame of RGB image meet the timing requirements, if so, the fusion network adjusts the fusion weight based on the current frame of RGB image, the current frame of dense point cloud data, the previous frame of RGB image and the previous frame of dense point cloud data, and outputs the data fusion result, specifically including:

calculating the normalized mutual information between the current frame of RGB image and the previous frame of RGB image, wherein if the normalized mutual information is greater than 0.5, the timing requirement is satisfied, and the fusion network obtains the expected feature according to the previous frame of RGB image and the previous frame of dense point cloud data, calculates the first branch mutual information according to the first feature tensor and the expected feature of the current frame of RGB image, calculates the second branch mutual information according to the second feature tensor and the expected feature of the current frame of dense point cloud data, reassigns the fusion weights according to the principle that the ratio of different branch fusion weights is proportional to the ratio of mutual information, and outputs the data fusion result and records the expected feature of the current frame;

otherwise, the fusion weights are not reassigned.

An adaptive multi-sensor data fusion system based on mutual information includes: a camera and a LIDAR mounted on a vehicle, a preprocessing module, a result output module and a fusion network, wherein the camera is configured to collect an RGB image of a road surface;

the LIDAR is configured to collect synchronously point cloud data of the road surface;

the preprocessing module is configured to preprocess the point cloud data to obtain dense point cloud data;

the result output module is configured to input the RGB image and the dense point cloud data into a pre-established and well-trained fusion network, to output data fusion results; and the fusion network is configured to calculate the mutual information of the feature tensor and the expected feature of the input data, assign fusion weights of the input data according to the mutual information, and then output data fusion results according to the fusion weights.

As an improvement of the above system, the specific implementation process of the preprocessing module is as follows:

projecting the point cloud data onto the pixel plane using the conversion matrix of the LIDAR coordinate system and the camera imaging coordinate system, to obtain the two-dimensional point cloud data corresponding to the grayscale image; and performing interpolation operation on the two-dimensional point cloud data to obtain dense point cloud data.

As an improvement of the above system, the fusion network includes a mutual information calculating module, and the specific implementation process of the mutual information calculating module is as follows:

calculating the mutual information I(X;Y) according to random variables X and Y:

$$I(X;Y) = \sum_{x \in X} \sum_{y \in Y} p(x,y) \log \frac{p(x,y)}{p(x)p(y)}$$

wherein p(x,y) is the joint probability density function of the random variables X and Y, p(x) is the marginal probability density function of the random variable X, and p(y) is the marginal probability density function of the random variable Y;

the mutual information I(X;Y) is represented in the form of KL divergence:

$$I(X;Y) = D_{KL}(P_{XY} \| P_X \otimes P_Y)$$

wherein, $$D_{KL}(P_{XY} \| P_X \otimes P_Y) := E_{P_{XY}}\left[\log \frac{dP_{XY}}{d(P_X \otimes P_Y)}\right]$$

wherein $D_{KL}(\cdot)$ represents the KL divergence of the mutual information, $P_X$ is the probability of the random variable X, $P_Y$ is the probability of the random variable Y, $P_{XY}$ is the joint probability of the random variables X and Y, and $E_{P_{XY}}$ represents the expected value of $P_{XY}$;

$P_{XY}$ is recorded as J, and $P_X \otimes P_Y$ is recorded as M;

the lower limit Î of mutual information is obtained according to the form and nature of the DV distribution of KL divergence:

$$I(X;Y) \geq \hat{I}(X;Y) = E_J[T_\omega(x,y)] - \log E_M[e^{T_\omega(x,y)}]$$

wherein, $T_\omega : x \times y \to R$ is the function containing parameter $\omega$, $E_J$ represents the expected value of $T_\omega(x,y)$, $E_M$ represents the expected value of $e^{T_\omega(x,y)}$, the lower limit Î of mutual information calculated from the function is close enough to the actual value, and the function is specifically realized as follows:

the form of the feature tensor $X_1$ of the first branch is (C, $H_1$, $M_1$, $N_1$), wherein C is the number of channels of the first branch, ($H_1$, $M_1$, $N_1$) represents C feature maps and is recorded as $X_{1,n}$, n=1, ..., C, in is a certain channel of the first branch, and the lower limit $\hat{I}(X_{1,n};Y)$ of mutual information of the first branch is obtained as follows through the calculating formula of the lower limit Î of mutual information:

$$\hat{I}(X_{1,n};Y) = \log(\Sigma S_1 e^{u_{1,n} - u_{1,max}}) + u_{1,max} - \log(\Sigma S_1) - \frac{\Sigma(u_{1,avg} \cdot S_1)}{\Sigma S_1}$$

wherein $S_1 = 1 - \overline{S_1}$, $\overline{S_1}$ is a diagonal matrix of $H_1 \cdot H_1$, the matrix $U_1 = X_{1,n} \cdot Y$, $u_{1,n}$ is an element in $U_1$, $u_{1,max}$ is the maximum value of each element in $U_1$, $u_{1,avg}$ is an average value of each element in $U_1$, therefore, the mutual information $I(X_1;Y)$ of the first branch is obtained:

$$I(X_1;Y) = \frac{1}{C} \sum_{n=1}^{C} I(X_{1,n};Y);$$

the form of the feature tensor $X_2$ of the second branch is (D, $H_2$, $M_2$, $N_2$), wherein D is the number of channels of the second branch, ($H_2$, $M_2$, $N_2$) represents D feature maps and is recorded as $X_{2,m}$, m=1, ..., D, n is a certain channel of the second branch, and the lower limit $\hat{I}(X_{2,m};Y)$ of mutual information of the second branch is obtained as follows through the calculating formula of the lower limit Î of mutual information:

$$\hat{I}(X_{2,m};Y) = \log(\Sigma S_2 e^{u_{2,m} - u_{2,max}}) + u_{2,max} - \log(\Sigma S_2) - \frac{\Sigma(u_{2,avg} \cdot S_2)}{\Sigma S_2}$$

wherein $S_2 = 1 - \overline{S_2}$, $\overline{S_2}$ is a diagonal matrix of $H_2 \cdot H_2$, the matrix $U_2 = X_{2,m} \cdot Y$, $u_{2,m}$ is an element in $U_2$, $u_{2,max}$ is the maximum value of each element in $U_2$, $u_{2,avg}$ is an average value of each element in $U_2$, therefore, the mutual information $I(X_2;Y)$ of the second branch is obtained.

$$I(X_2;Y) = \frac{1}{D} \sum_{m=1}^{D} I(X_{2,m};Y).$$

As an improvement of the above system, the system further includes a time series data adaptive adjustment module; and the specific implementation process of the time series data adaptive adjustment module is as follows:

calculating the normalized mutual information between the current frame of RGB image and the previous frame of RGB image, wherein if the normalized mutual information is greater than 0.5, the timing requirement is satisfied, and the fusion network obtains the expected feature according to the previous frame of RGB image and the previous frame of dense point cloud data, calculates the first branch mutual information according to the first feature tensor and the expected feature of the current frame of RGB image, calculates the second branch mutual information according to the second feature tensor and the expected feature of the current frame of dense point cloud data, reassigns the fusion weights according to the principle that the ratio of different branch fusion weights is proportional to the ratio of mutual information, and outputs the data fusion result and records the expected feature of the current frame; otherwise, the fusion weights are not reassigned by the fusion network.

Compared with the prior art, the present invention has the following advantages:

1. In the method of the present invention, such information theory tool as mutual information is introduced, to calculate the correlation between the extracted feature of the input data and the expected feature of the fusion network, thereby reasonably and objectively quantifying the quality of the data and the amount of information, with a strict mathematical method as the theoretical support and a certain degree of interpretability.

2. In the present invention, through a feasible image mutual information calculating method, the lower limit of mutual information closer to the actual value can be obtained quickly and accurately, then practical application of the method is possible and the present invention can be applied to network training, and processing of time series data.

3. In the method of the present invention, a method of introducing the information of time series data into a fusion model is proposed, which can handle continuous data input. During the processing, the fusion weights can be adjusted adaptively according to the amount of information of the input data, so that the fusion effect can be optimal.

DETAILED DESCRIPTION OF THE EMBODIMENTS

Figure 1:
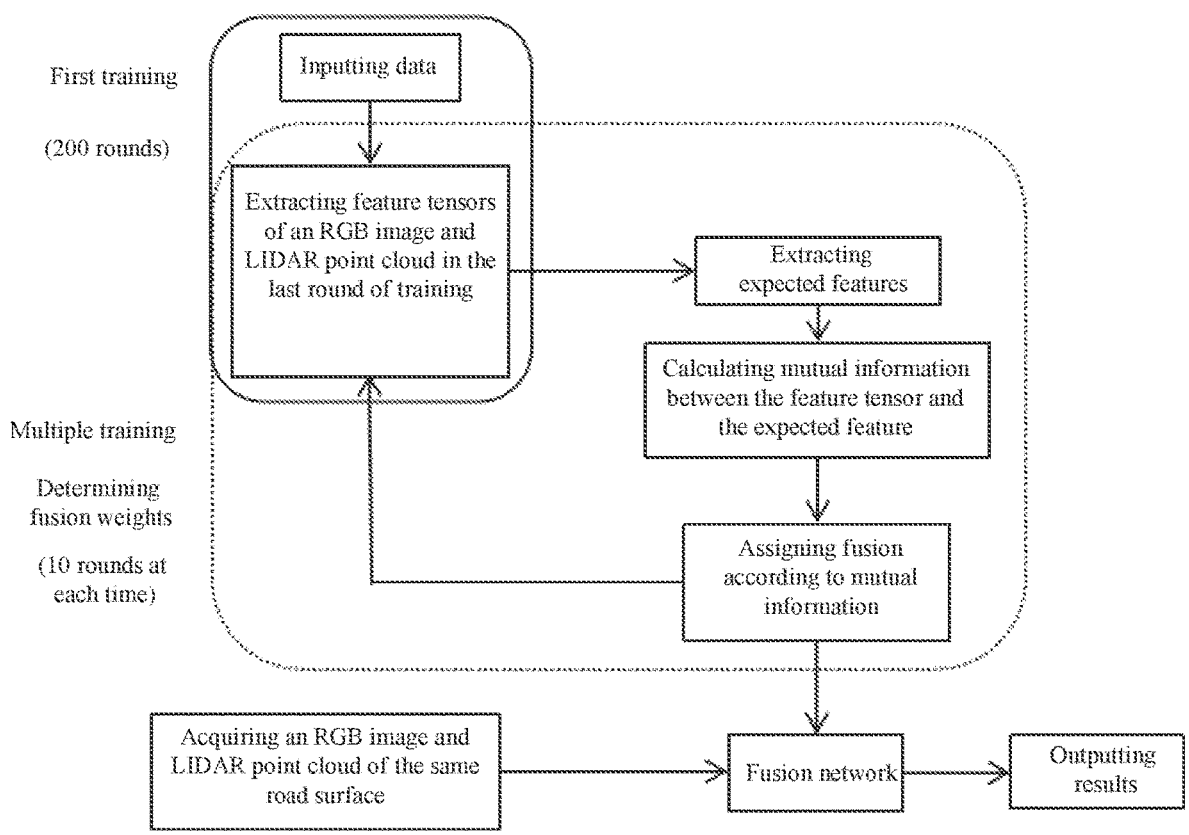
FIG. 1 is a flow chart of an adaptive multi-sensor data fusion method based on mutual information provided in Embodiment 1 of the present invention.

The present invention provides an adaptive multi-sensor data fusion method based on mutual information, and the technical solutions are as follows:
1. Input data of different auto sensors are correspondingly preprocessed;
2. The preprocessed data are input into a fusion network, feature tensors are extracted for different fusion branches, generally speaking, the dimension of the feature tensor does not exceed four dimensions;
3. Expected features are extracted, that is, feature maps corresponding to expected output of the fusion network are extracted;
4. Mutual information of the feature tensor and expected feature is calculated; and
5. Fusion weights are assigned according to mutual information, and the ratio of the fusion weights of different branches is proportional to the ratio of the mutual information, i.e., the fusion branch with larger mutual information of the expected features corresponds to larger fusion weights.

The technical solutions in the embodiments of the present invention will be clearly and completely described below in combination with the accompanying drawings in the embodiments of the present invention, obviously, the described embodiments are merely a part, but not all, of the embodiments of the present invention. Based on the embodiments in the present invention, all the other embodiments obtained by those skilled in the art without any creative effort shall all fall within the protection scope of the present invention.

Before introducing the embodiments of the present invention, the relevant nouns involved in the embodiments of the present invention are firstly explained as follows:

Mutual information refers to an information measurement in the information theory and can represent the amount of information that a random variable contains another random variable, i.e., observing the degree of uncertainty reduction of another random variable caused by the distribution of a certain random variable. The mutual information I(X;Y) of the random variables X and Y is calculated as follows.

$$I(X;Y) = \sum_{x \in X} \sum_{y \in Y} p(x,y) \log \frac{p(x,y)}{p(x)p(y)}$$

Point cloud refers to the point data obtained by LIDAR about the appearance surface of the object, and each point data contains x, y, z coordinates and reflection intensity r.

RGB image refers to the RGB picture collected by the vehicle-mounted camera as a three-channel image.

Expected features refer to the features that are expected to be contained in the data when the data is processed using the fusion network. Exemplarily, when a lane line recognition task is performed, when lane line features are expected to be contained in the data, the typical lane line feature map is the expected feature.

Fusion weight refers to the coefficient by which the input data are fused in the fusion network, which characterizes the relative importance of the amount of information in the data to the fusion network.

The technical solutions of the present invention are described in detail below in combination with the accompanying drawings and embodiments.

Embodiment 1

As shown in FIG. 1, Embodiment 1 of the present invention provides an adaptive multi-sensor data fusion method based on mutual information, with RGB images, LIDAR point cloud data as an example, the following steps are specifically included:

step 1) acquiring an RGB image and LIDAR point cloud of the same road surface, specifically including:

step 101) acquiring an RGB image G through a vehicle-mounted camera;

A forward-facing monocular camera or a forward-facing monocular webcam mounted on a moving vehicle is adopted to collect road surface image information. The forward-facing monocular camera collects the road surface image information directly in front of the driving direction of the driving vehicle and above the road surface. That is, the collected road surface image information is a perspective view corresponding to the collected information directly in front of the driving direction of the driving vehicle and above the road surface.

Step 102) acquiring original point cloud PC0 through vehicle-mounted LIDAR.

In the present embodiment, the road surface image information and the road surface point cloud information are collected synchronously. That is, after the LIDAR and forward-facing monocular camera are mounted and configured on the driving vehicle, their relative position postures can be calibrated, and at the same time the road surface data information can be collected on the same road surface.

To facilitate calculation, the point clouds involved in the following embodiments of the present invention are all the parts of the 3600 point cloud directly in front of the vehicle, i.e., in the direction in which the image is located. Moreover, since the camera and LIDAR have already been calibrated, the conversion matrix T of the point cloud projecting onto the pixel plane can be determined to facilitate subsequent feature extraction of the point cloud information.

For the calibration of the camera, Zhang's calibration method is adopted, first the camera coordinate system and the world coordinate system are set, the imaging of the camera on the tessellation grid placed at the preset position is used to calculate the two-dimensional coordinates of the corner point position of the tessellation grid in the image, and then the conversion matrix is calculated with the real three-dimensional coordinates of the corner points of the tessellation grid; for the calibration of the LIDAR, first the LIDAR coordinate system and the real world coordinate system are set, a number of obstacles are placed and aligned at preset positions for LIDAR scanning, the coordinates of the point cloud obtained from the obstacles in the LIDAR coordinate system and the coordinates of the obstacles in the real world coordinate system are used to calculate the conversion matrix of the two coordinate systems, and the remaining parameters, including the scanning resolution of the LIDAR, scanning speed, time alignment of the LIDAR and the camera, etc., can be obtained from the respective hardware information and measurements at the time of installation. The calibration will obtain the inter-conversion matrix between the world coordinate system and the imaging coordinate system of the camera, and between the world coordinate system and the LIDAR coordinate system.

Figure 2:
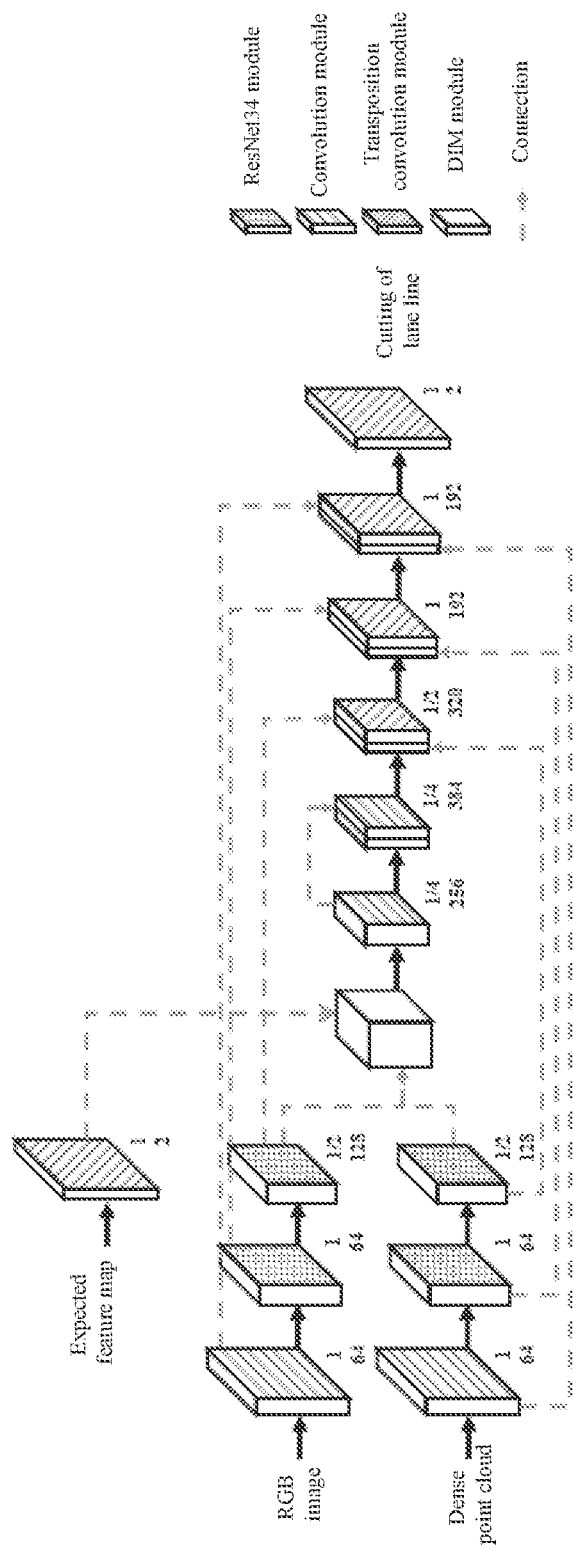
FIG. 2 is a structural diagram of a data fusion model network of Embodiment 1 of the present invention.

Step 2) extracting feature tensors X1 and X2 of the RGB image G and LIDAR point cloud PC0, specifically including:

step 201) projecting the point cloud onto a pixel plane using a conversion matrix T, to obtain the original point cloud image PCG0;

Specifically, consider that the LIDAR and the forward-facing camera have been calibrated, and the conversion matrix $K_1$ between the LIDAR three-dimensional coordinate system and the world three-dimensional coordinate system, and the conversion matrix $K_2$ between the camera two-dimensional imaging coordinate system and the world three-dimensional coordinate system are obtained according to the calibration parameters. Suppose that a point P exists under the world coordinate system, and the corresponding three-dimensional coordinate under the world coordinate system is $X_0$, and the corresponding three-dimensional coordinate in the radar coordinate system at which the point cloud is located is $X_1$, and the two-dimensional coordinate in the camera imaging coordinate system is U, then $U=K_2 \cdot X_0$, $X_1=K_1 \cdot X_0$, so $U=K_2 \cdot K_1^{-1} \cdot X_0$. Next, the part of the two-dimensional point cloud image at the corresponding position and of the same size as the grayscale image is intercepted, the value of each pixel point is the corresponding reflection intensity value, and then the vacant part is filled with 0 value. Therefore, the LIDAR point cloud can be converted into a two-dimensional point cloud image corresponding to the grayscale image, which is recorded as PCG0.

step 202) performing interpolation operation on the original point cloud image PCG0, such as the nearest neighbor interpolation method, to obtain a dense point cloud image PCG;

step 203) performing convolution on the RGB image G and the dense point cloud image PCG, to obtain the original feature tensors XO1 and XO2, respectively; and step 204) setting separate feature processing branches (in this example, the number of branches is 2) for different sensor data, and performing multiple convolution operations on the original feature tensor (or the feature tensor obtained by fusing multiple original feature tensors) respectively, wherein the number of operations is determined by the input data size and network structure, as shown in FIG. 2 which is a structural diagram of the data fusion model network.

After feature tensor is extracted, two feature tensors are respectively obtained from two branches.

Step 3) extracting expected features;

the fusion network is trained for multiple rounds with determined fusion weights, and the classification features output from the network converged after training are used as the expected features, that is, any data of the training dataset corresponds to a certain classification feature of the network, and this feature map is the expected feature corresponding to the data.

Figure 3:
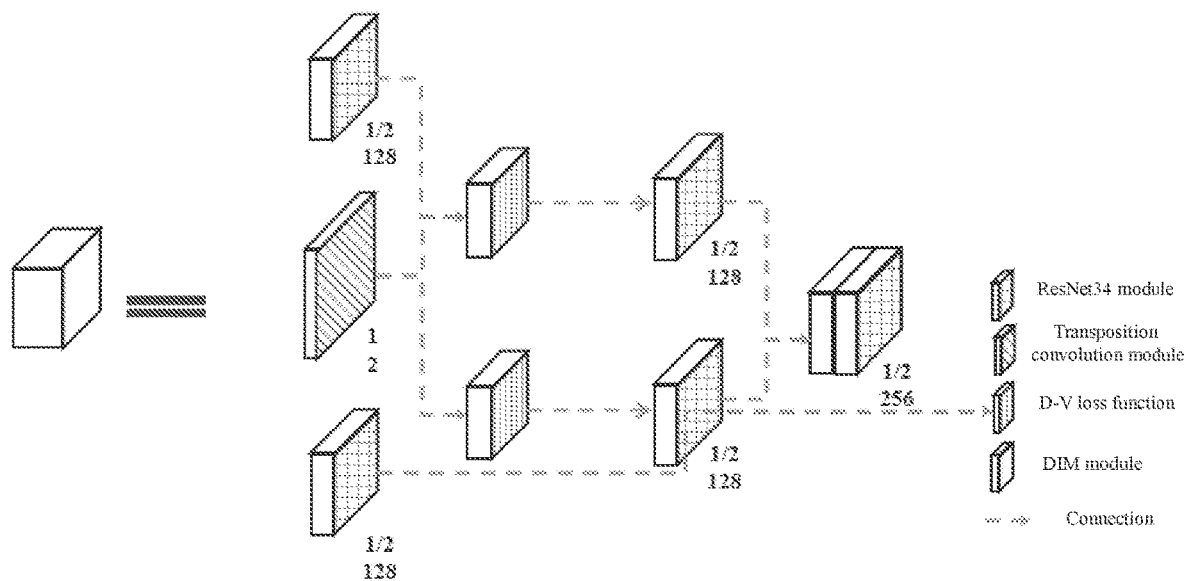
FIG. 3 is a structural diagram of a data fusion model mutual information calculating module of Embodiment 1 of the present invention.

Step 4) calculating mutual information between the feature tensor and the expected feature Y;

a mutual information calculating module is added to the fusion network, and the specific structure of the mutual information calculating module is shown in FIG. 3, wherein the feature tensor of two branches and the expected feature are taken as input to output the mutual information.

The calculating formula of the mutual information of the random variables X and Y is as follows:

$$I(X;Y) = \sum_{x \in X} \sum_{y \in Y} p(x,y) \log \frac{p(x,y)}{p(x)p(y)}$$

wherein $P_X$ is the probability of the random variable X, $P_Y$ is the probability of the random variable Y, $P_{XY}$ is the joint probability of the random variables X and Y, $E_P$ represents the expected value of the data, P represents the true distribution of the data, and Q represents the theoretical distribution of the data;

wherein the mutual information can be represented in the form of KL divergence:

$$I(X;Y)=D_{KL}(P_{XY}\|P_X \otimes P_Y)$$

wherein $D_{KL}$ is defined as follows:

$$D_{KL}(P\|Q) \approx E_P\left[\log \frac{dP}{dQ}\right]$$

to obtain:

$$D_{KL}(P_{XY} \| P_X \otimes P_Y) \approx E_{P_{XY}}\left[\log \frac{dP_{XY}}{d(P_X \otimes P_Y)}\right]$$

wherein $D_{KL}(\bullet)$ represents the KL divergence of the mutual information, $P_X$ is the probability of the random variable X, $P_Y$ is the probability of the random variable Y, $P_{XY}$ is the joint probability of the random variables X and Y, and $E_{P_{XY}}$ represents the expected value of $P_{XY}$;

$P_{XY}$ is recorded as J and $P_X \otimes P_Y$ is recorded as M. The lower limit $\hat{I}$ of mutual information can be obtained using the form and nature of the DV distribution of KL divergence:

$$I(X;Y) \geq \hat{I}(X;Y)=E_J[T_\omega(x,y)]-\log E_M[e^{T_\omega(x,y)}]$$

wherein $T_\omega: x \times y \to R$ is a function containing parameter $\omega$, $E_J$ represents the expected value of $T_\omega(x,y)$, $E_M$ represents the expected value of $e^{T_\omega(x,y)}$, and the lower limit $\hat{I}$ of mutual information calculated by the function is close enough to the actual value, and the actual value of mutual information can be approximated continuously by optimizing $\omega$. In the present embodiment, a function $T_\omega$ is given, and the lower limit $\hat{I}$ of mutual information calculated by the function can be considered to be close enough to the actual value. The function is specifically as follows:

the input feature tensor $X_1$ and $X_2$ have the same dimension (no more than four dimensions), i.e., the processes of calculating mutual information are consistent in mathematical form.

the form of the feature tensor $X_1$ of the first branch is (C, $H_1$, $M_1$, $N_1$), wherein C is the number of channels of the first branch, ($H_1$, $M_1$, $N_1$) represents C feature maps and is recorded as $X_{1,n}$, n=1, . . . , C, n is a certain channel of the first branch, and the following is obtained through the calculating formula of the lower limit $\hat{I}$ of mutual information:

$$I(X_{1,n}; Y) \doteq$$
$$\hat{I}(X_{1,n}; Y) = \log(\Sigma S_1 e^{u_{1,n}-u_{1,max}}) + u_{1,max} - \log(\Sigma S_1) - \frac{\Sigma(u_{1,avg} \cdot S_1)}{\Sigma S_1}$$

wherein $S_1=1-\overline{S_1}$, $\overline{S_1}$ is a diagonal matrix of $H_1 \cdot H_1$, the matrix $U_1 = X_{1,n} \cdot Y$, $u_{1,n}$ is an element in $U_1$, $u_{1,max}$ is the maximum value of each element in $U_1$, $u_{1,avg}$ is an average value of each element in $U_1$, therefore, the mutual information $I(X_1;Y)$ of the first branch is obtained:

$$I(X_1; Y) = \frac{1}{C}\sum_{n=1}^{C} I(X_{1,n}; Y);$$

the form of the feature tensor $X_2$ of the second branch is $(D, H_2, M_2, N_2)$, wherein D is the number of channels of the second branch, $(H_2, M_2, N_2)$ represents D feature maps and is recorded as $X_{2,m}$, $m=1, \ldots, D$, m is a certain channel of the second branch, and the following is obtained through the calculating formula of the lower limit $\hat{I}$ of mutual information:

$$I(X_{2,m}; Y) \doteq \hat{I}(X_{2,m}; Y) =$$
$$\log\left(\sum S_2 e^{u_{2,m}-u_{2,max}}\right) + u_{2,max} - \log\left(\sum S_2\right) - \frac{\sum(u_{2,avg} \cdot S_2)}{\sum S_2}$$

wherein $S_2=1-\overline{S_2}$, $\overline{S_2}$ is a diagonal matrix of $H_2 \cdot H_2$, the matrix $U_2 = X_{2,m} \cdot Y$, $u_{2,m}$ is an element in $U_2$, $u_{2,max}$ is the maximum value of each element in $U_2$, $u_{2,avg}$ is an average value of each element in $U_2$, therefore, the mutual information $I(X_2;Y)$ of the second branch is obtained:

$$I(X_2; Y) = \frac{1}{D}\sum_{m=1}^{D} I(X_{2,m}; Y).$$

step 5) assigning fusion weights according to mutual information.

When the fusion weights need to be assigned after a round of training is finished, consider that any data in the training dataset has two branches of mutual information $I(X_1;Y)$, $I(X_2;Y)$, and the fusion weights are assigned according to the average mutual information size of all the data, so that the ratio of branch weights is proportional to the ratio of the average mutual information of the branches. If the difference between the reassigned weights and the pre-assigned weights is less than a threshold value, the assigned weights are considered to be converged.

In view of the fact that those skilled in the art should understand the training process of a neural network model, the description is as follows:

The YOLOv3 neural network is implemented based on the tool PyTorch. After setting the size of the encoder and decoder of the network, the number of batches, the number of training rounds (the number of the first training rounds should be large, to ensure that the fusion network is converged, for example, 200 rounds) and other hyperparameters, the training starts at a fusion weight of 1:1. The feature tensors of the two branches of the fusion network are obtained in the last round of training, and the expected features are extracted at the end of training, mutual information is calculated, and fusion weights are assigned. If the difference between the weights before and after assignment is less than a threshold value, the fusion weights are considered to be converged; otherwise, the fusion weights are updated, a certain number of training rounds (the number of rounds is relatively small, e.g., 10 rounds) are performed, and the operation of assigning fusion weights is repeated until the difference between the weights before and after assignment is less than the threshold value, i.e., the fusion weights are converged.

Exemplarily, 200 rounds can be trained for the first time, and then 10 rounds are trained when the fusion weights are updated each time, until the difference between the weights before and after the assignment is less than the threshold value, i.e., the fusion weights are converged.

When the neural network has finished training, the test of new images can start. The fusion weights corresponding to the input data in the testing stage are the converged fusion weights.

Embodiment 2

Figure 4:
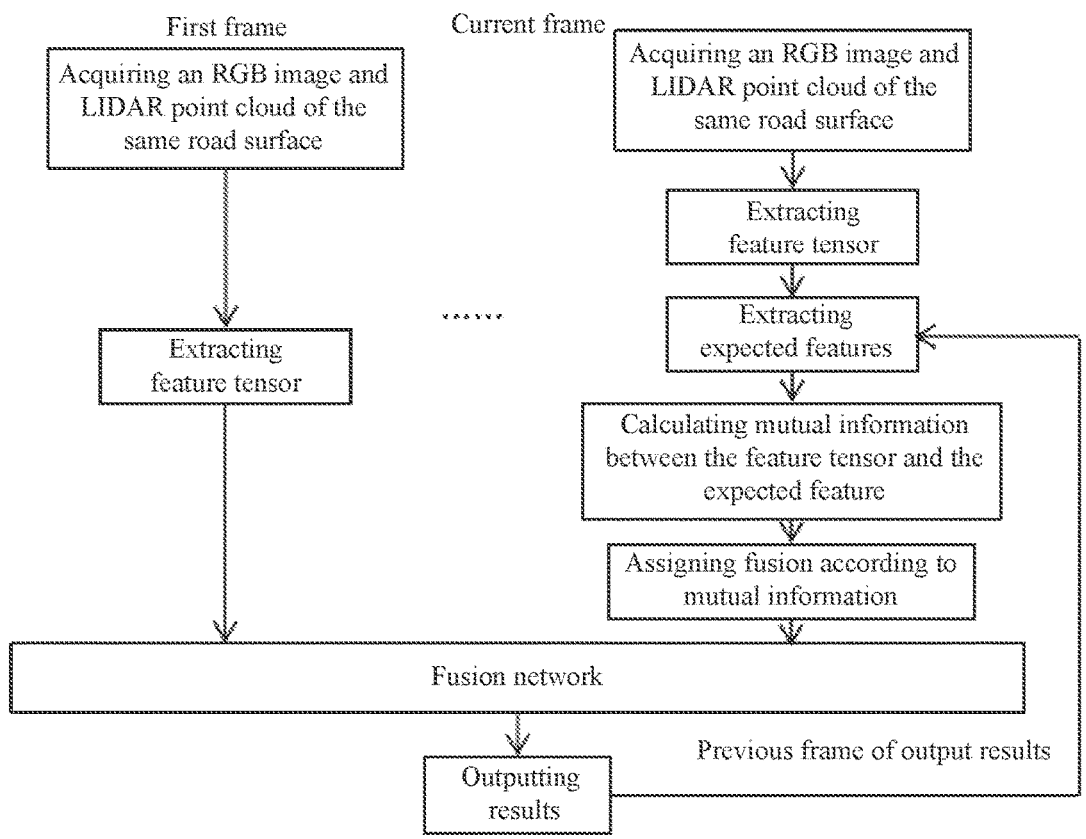
FIG. 4 is a flow chart of an adaptive multi-sensor data fusion method based on mutual information aiming at time series data information of Embodiment 2 of the present invention.

As shown in FIG. 4, Embodiment 2 of the present invention provides an adaptive multi-sensor data fusion method based on mutual information aiming at time series data information, with RGB images, LIDAR point cloud data as an example, the following steps are specifically included:

step 1) acquiring an RGB image and LIDAR point cloud of the same road surface;

the RGB images are required to be sequential, i.e., the previous frame of image has some continuity with the current frame of image, and the expected features are consistent. When the normalized mutual information between any two consecutive frames of images is considered to be greater than 0.5, the images are sequential. The LIDAR point cloud data are required to be consistent.

The remaining is consistent with that in Embodiment 1.

Step 2) is consistent with that in Embodiment 1;

step 3) extracting an expected feature Y;

For time series data, if the fusion network is assumed to have better initial values, the output of the previous frame is more reliable and can be taken as the expected feature of the current frame. In Embodiment 2, the classification feature map output by the fusion network of the previous frame of data is taken as the expected feature Y of the current frame of data.

Step 4) is consistent with that in Embodiment 1;

step 5) assigning fusion weights according to mutual information.

Each of the two branches of the current frame in the fusion network has branch mutual information, fusion weights are assigned according to the size of the mutual information, so that the ratio of branch weights is proportional to the ratio of branch mutual information.

In view of the fact that those skilled in the art should understand the training process of a neural network model, the description is as follows:

The YOLOv3 neural network is implemented based on the tool PyTorch. After setting the size of the encoder and decoder of the network, the number of batches, the number of training rounds and other hyperparameters that need to be manually preset, the training starts at a fusion weight of 1:1.

When the neural network has finished training, test can begin. The time series data is input in the test stage. The fusion weight corresponding to the first frame is 1:1, and the fusion weights corresponding to the remaining frames are assigned according to the size of mutual information.

Embodiment 3

Based on the method of Embodiment 1 and Embodiment 2, Embodiment 3 of the present invention provides an adaptive multi-sensor data fusion system based on mutual information, and the system includes: a camera and a LIDAR mounted on a vehicle, a preprocessing module, a result output module, a time series data adaptive adjustment module and a fusion network, wherein the camera is configured to collect an RGB image of a road surface;

the LIDAR is configured to collect synchronously point cloud data of the road surface;

the preprocessing module is configured to preprocess the point cloud data to obtain dense point cloud data;

the result output module is configured to input the RGB image and the dense point cloud data into a pre-established and well-trained fusion network, to output data fusion results; and the fusion network is configured to calculate the mutual information of the feature tensor and the expected feature of the input data, assign fusion weights of the input data according to the mutual information, and then output data fusion results according to the fusion weights;

the specific implementation process of the time series data adaptive adjustment module is as follows:

calculating the normalized mutual information between the current frame of RGB image and the previous frame of RGB image, wherein if the normalized mutual information is greater than 0.5, the timing requirement is satisfied, and the fusion network obtains the expected feature based on the previous frame of RGB image and the previous frame of dense point cloud data, calculates the first branch mutual information according to the first feature tensor and the expected feature of the current frame of RGB image, calculates the second branch mutual information according to the second feature tensor and the expected feature of the current frame of dense point cloud data, reassigns the fusion weights according to the principle that the ratio of different branch fusion weights is proportional to the ratio of mutual information, and outputs the data fusion result and records the expected feature of the current frame:

otherwise, the fusion weights are not reassigned by the fusion network.

Embodiment 4

A computer device includes a memory, a processor and a computer program stored on the memory and running on the processor, and the processor implements the method of Embodiment 1 and Embodiment 2 when executing the computer program.

Embodiment 5

A computer readable storage medium is provided, wherein the computer readable storage medium is stored with computer programs, and the computer programs implement the method of Embodiment 1 and Embodiment 2 when being executed by the processor.

It should be noted that the embodiments of the present application take the data acquired by the camera and LIDAR as an example, but are not limited to the above data; and the data of other vehicle-mounted sensors can be fused through this method to obtain the fusion weights.

Those skilled in the art can realize that the units and algorithmic steps of various examples described in combination with the embodiments disclosed herein are capable of being implemented in electronic hardware, or a combination of computer software and electronic hardware. Whether these functions are performed in hardware or software depends on the particular application and design constraints of the technical solution. Those skilled in the art may use different methods to implement the described functions for each particular application, but such implementations should not be considered to go beyond the scope of the present invention.

Finally, it should be noted that the above embodiments are merely used to illustrate rather than limiting the technical solution of the present invention. Although the present invention is described in detail with reference to the embodiments, those skilled in the art should understand that any modification or equivalent substitution made to the technical solution of the present invention does not depart from the spirit and scope of the technical solution of the present invention, and such modification or equivalent substitution should all fall within the scope of the claims of the present invention.

What is claimed is:

1. An adaptive multi-sensor data fusion method based on mutual information, comprising:

receiving an RGB image of a road surface collected by a camera;

receiving point cloud data of the road surface collected synchronously by LIDAR;

preprocessing the point cloud data to obtain dense point cloud data; and inputting the RGB image and the dense point cloud data into a pre-established and well-trained fusion network, to output data fusion results;

wherein a fusion network is configured to calculate mutual information of a feature tensor and an expected feature of input data, assign fusion weights of the input data according to the mutual information, and then output the data fusion results according to the fusion weights, wherein the expected feature is a feature expected to be contained in data;

wherein the fusion network comprises a mutual information calculating module, and the mutual information calculating module is specifically implemented as follows:

calculating the mutual information $I(X;Y)$ according to a random variable X and a random variable Y:

$$I(X;Y) = \sum_{x \in X}\sum_{y \in Y} p(x,y) \log \frac{p(x,y)}{p(x)p(y)},$$

wherein p(x,y) is a joint probability density function of the random variable X and the random variable Y, p(x) is a marginal probability density function of the random variable X, and p(y) is a marginal probability density function of the random variable Y;

the mutual information I(X;Y) is represented in a form of KL divergence:

$$I(X;Y)=D_{KL}(P_{XY}\|P_X\otimes P_Y),$$

wherein, $$D_{KL}(P_{XY}\|P_X\otimes P_Y):=E_{P_{XY}}\left[\log\frac{dP_{XY}}{d(P_X\otimes P_Y)}\right],$$

wherein $D_{KL}(\bullet)$ represents the KL divergence of the mutual information, $P_X$ is a probability of the random variable X, $P_Y$ is a probability of the random variable Y, $P_{XY}$ is a joint probability of the random variable X and the random variable Y, and $E_{P_{XY}}$ represents an expected value of $P_{XY}$;
$P_{XY}$ is recorded as J, and $P_X\otimes P_Y$ is recorded as M;
a lower limit $\hat{I}$ of the mutual information is obtained according to a form and a nature of a DV distribution of the KL divergence:

$$I(X;Y)\geq\hat{I}(X;Y)=E_J[T_\omega(x,y)]-\log E_M[e^{T_\omega(x,y)}],$$

wherein, $T_\omega:x\times y\to R$ is a function containing a parameter $\omega$, $E_J$ represents an expected value of $T_\omega(x,y)$, $E_M$ represents an expected value of $e^{T_\omega(x,y)}$, the lower limit $\hat{I}$ of the mutual information calculated from the function sufficiently approximates an actual value, and the function is specifically realized as follows:
a form of a feature tensor $X_1$ of a first branch is (C, $H_1$, $M_1$, $N_1$), wherein C is a number of channels of the first branch, ($H_1$, $M_1$, $N_1$) represents C feature maps and is recorded as $X_{1,n}$, wherein $H_1$, $M_1$, $N_1$ respectively represent three-dimensional values of the feature tensor $X_1$ of the first branch, n=1, . . . , C, it is a channel number of the first branch, and a lower limit $\hat{I}(X_{1,n};Y)$ of $n^{th}$ channel of mutual information of the first branch is obtained as follows through a calculating formula of the lower limit $\hat{I}$ of the mutual information:

$$\hat{I}(X_{1,n};Y)=\log\left(\sum S_1 e^{u_{1,n}-u_{1,max}}\right)+u_{1,max}-\log\left(\sum S_1\right)-\frac{\sum(u_{1,avg}\cdot S_1)}{\sum S_1},$$

wherein $S_1=1-\overline{S_1}$, $\overline{S_1}$ is a diagonal matrix of $H_1\cdot H_1$, a matrix $U_1=X_{1,n}\cdot Y$, $u_{1,n}$ is an element in $U_1$, $u_{1,max}$ is a maximum value of each element in $U_1$, $u_{1,avg}$ is an average value of each element in $U_1$, wherein let $I(X_{1,n};Y)=\hat{I}(X_{1,n};Y)$, then the mutual information $I(X_1;Y)$ of the first branch is obtained according to C channels of the first branch:

$$I(X_1;Y)=\frac{1}{C}\sum_{n=1}^C I(X_{1,n};Y);$$

a form of a feature tensor $X_2$ of a second branch is (D, $H_2$, $M_2$, $N_2$), wherein D is a number of channels of the second branch, ($H_2$, $M_2$, $N_2$) represents D feature maps and is recorded as $X_{2,m}$, wherein $H_2$, $M_2$, $N_2$ respectively represent three-dimensional values of the feature tensor $X_2$ of the second branch, m=1, . . . , D, m is a channel number of the second branch, and a lower limit $\hat{I}(X_{2,m};Y)$ of $m^{th}$ channel of mutual information of the second branch is obtained as follows through the calculating formula of the lower limit $\hat{I}$ of the mutual information:

$$\hat{I}(X_{2,m};Y)=\log\left(\sum S_2 e^{u_{2,m}-u_{2,max}}\right)+u_{2,max}-\log\left(\sum S_2\right)-\frac{\sum(u_{2,avg}\cdot S_2)}{\sum S_2}$$

wherein $S_2=1-\overline{S_2}$, $\overline{S_2}$ is a diagonal matrix of $H_2\cdot H_2$, a matrix $U_2=X_{2,m}\cdot Y$, $u_{2,m}$ is an element in $U_2$, $u_{2,max}$ is a maximum value of each element in $U_2$, $u_{2,avg}$ is an average value of each element in $U_2$, wherein let $I(X_{2,m};Y)=\hat{I}(X_{2,m};Y)$, then the mutual information $I(X_2;Y)$ of the second branch is obtained according to D channels of the second branch:

$$I(X_2;Y)=\frac{1}{D}\sum_{m=1}^D I(X_{2,m};Y).$$

2. The adaptive multi-sensor data fusion method based on the mutual information of claim 1, wherein the step of preprocessing the point cloud data to obtain the dense point cloud data specifically comprises:
projecting the point cloud data onto a pixel plane using a conversion matrix of an LIDAR coordinate system and a camera imaging coordinate system, to obtain two-dimensional point cloud data corresponding to a gray-scale image; and
performing interpolation operation on the two-dimensional point cloud data to obtain the dense point cloud data.

3. The adaptive multi-sensor data fusion method based on the mutual information of claim 2, further comprising a training step of the fusion network, specifically comprising:
step 1): taking well-marked RGB image and dense point cloud data as a training set,
step 2): setting an initial fusion weight to 1:1;
step 3): inputting the RGB image and the dense point cloud data in the training set into the fusion network, after p rounds of training, determining hyperparameters of the fusion network, and obtaining feature tensors and expected features of two branches; and calculating the mutual information with a mutual information calculating module and assigning the fusion weights;
step 4): calculating a difference between the assigned fusion weight and the initial weight, when the difference is smaller than a threshold value, then the assigned fusion weight converges, and a training of the fusion network is completed, otherwise, turning to step 5); and
step 5): with q rounds as a training period, in each round, selecting the RGB image and the dense point cloud data in the training set and inputting into the fusion network, and adjusting the hyperparameters of the fusion network; in a q-th round, calculating the mutual information by the mutual information calculating module according to the feature tensors and the expected features, and assigning the fusion weights; and turning to step 4).

4. The adaptive multi-sensor data fusion method based on mutual information of claim 1, wherein before inputting the RGB image and the dense point cloud data into the pre-established and well-trained fusion network to output data fusion results, the method further comprises: judging whether a current frame of the RGB image and a previous frame of the RGB image meet a timing requirement, wherein when the current frame of the RGB image and the previous frame of the RGB image meet the timing requirement, the fusion network adjusts the fusion weights based on the current frame of the RGB image, a current frame of the dense point cloud data, the previous frame of the RGB image and a previous frame of the dense point cloud data, and outputs the data fusion results, specifically comprising:

calculating normalized mutual information between the current frame of the RGB image and the previous frame of the RGB image, wherein when the normalized mutual information is greater than 0.5, the timing requirement is satisfied, and the fusion network obtains the expected feature according to the previous frame of the RGB image and the previous frame of the dense point cloud data, calculates the mutual information of the first branch according to a first feature tensor and an expected feature of the current frame of the RGB image, calculates the mutual information of the second branch according to a second feature tensor and an expected feature of the current frame of the dense point cloud data, reassigns the fusion weights according to a principle that a ratio of different branch fusion weights is proportional to a ratio of mutual information, and outputs the data fusion results and records the expected feature of the current frame; otherwise, the fusion weights are not reassigned.

5. An adaptive multi-sensor data fusion system based on mutual information, comprising: a camera and a LIDAR mounted on a vehicle, a preprocessing module, a result output module and a fusion network, wherein the camera is configured to collect an RGB image of a road surface;
the LIDAR is configured to collect synchronously point cloud data of the road surface;
the preprocessing module is configured to preprocess the point cloud data to obtain dense point cloud data;
the result output module is configured to input the RGB image and the dense point cloud data into a pre-established and well-trained fusion network, to output data fusion results; and
the fusion network is configured to calculate mutual information of a feature tensor and an expected feature of input data, assign fusion weights of the input data according to the mutual information, and then output data fusion results according to the fusion weights, wherein the expected feature is a feature expected to be contained in data;
wherein the fusion network comprises a mutual information calculating module, and a specific implementation process of the mutual information calculating module is as follows;
calculating the mutual information $I(X;Y)$ according to a random variable X and a random variable Y:

$$I(X;Y) = \sum_{x \in X}\sum_{y \in Y} p(x,y)\log\frac{p(x,y)}{p(x)p(y)},$$

wherein $p(x,y)$ is a joint probability density function of the random variable X and the random variable Y, $p(x)$ is a marginal probability density function of the random variable X, and $p(y)$ is a marginal probability density function of the random variable Y;
the mutual information $I(X;Y)$ is represented in a form of KL divergence:

$$I(X;Y)=D_{KL}(P_{XY}\|P_X \otimes P_Y),$$

wherein, $$D_{KL}(P_{XY}\|P_X \otimes P_Y) := E_{P_{XY}}\left[\log\frac{dP_{XY}}{d(P_X \otimes P_Y)}\right],$$

wherein $D_{KL}(\bullet)$ represents the KL divergence of the mutual information, $P_X$ is a probability of the random variable X, $P_Y$ is a probability of the random variable Y, $P_{XY}$ is a joint probability of the random variable X and the random variable Y, and $E_{P_{XY}}$ represents an expected value of $P_{XY}$;
$P_{XY}$ is recorded as J, and $P_X \otimes P_Y$ is recorded as M;
a lower limit $\hat{I}$ of the mutual information is obtained according to a form and a nature of a DV distribution of the KL divergence:

$$I(X;Y) \geq \hat{I}(X;Y)=E_J[T_\omega(x,y)]-\log E_M[e^{T_\omega(x,y)}],$$

wherein, $T_\omega:x \times y \to R$ is a function containing a parameter $\omega$, $E_J$ represents an expected value of $T_\omega(x,y)$, $E_M$ represents an expected value of $e^{T_\omega(x,y)}$, the lower limit $\hat{I}$ of the mutual information calculated from the function sufficiently approximates an actual value, and the function is specifically realized as follows:
a form of a feature tensor $X_1$ of a first branch is (C, $H_1$, $M_1$, $N_1$), wherein C is a number of channels of the first branch, ($H_1$, $M_1$, $N_1$) represents C feature maps and is recorded as $X_{1,n}$, wherein $H_1$, $M_1$, $N_1$ respectively represent three-dimensional values of the feature tensor $X_1$ of the first branch, n=1, ..., C, n is a channel number of the first branch, and a lower limit $\hat{I}(X_{1,n};Y)$ of $n^{th}$ channel of mutual information of the first branch is obtained as follows through a calculating formula of the lower limit $\hat{I}$ of the mutual information:

$$\hat{I}(X_{1,n};Y) = \log\left(\sum S_1 e^{u_{1,n}-u_{1,max}}\right) + u_{1,max} - \log\left(\sum S_1\right) - \frac{\sum(u_{1,avg} \cdot S_1)}{\sum S_1},$$

wherein $S_1=1-\overline{S_1}$, $\overline{S_1}$ is a diagonal matrix of $H_1 \cdot H_1$, a matrix $U_1=X_{1,n} \cdot Y$, $u_{1,n}$ is an element in $U_1$, $u_{1,max}$ is a maximum value of each element in $U_1$, $u_{1,avg}$ is an average value of each element in $U_1$, wherein let $I(X_{1,n};Y)=\hat{I}(X_{1,n};Y)$, then the mutual information $I(X_1;Y)$ of the first branch is obtained according to C channels of the first branch:

$$I(X_1;Y) = \frac{1}{C}\sum_{n=1}^{C} I(X_{1,n};Y);$$

a form of a feature tensor $X_2$ of a second branch is (D, $H_2$, $M_2$, $N_2$), wherein D is a number of channels of the second branch, ($H_2$, $M_2$, $N_2$) represents D feature maps and is recorded as $X_{2,m}$, wherein $H_2$, $M_2$, $N_2$ respectively represent three-dimensional values of the feature tensor $X_2$ of the second branch, m=1, ..., D, m is a channel number of the second branch, and a lower limit $\hat{I}(X_{2,m};Y)$ of $m^{th}$ channel of mutual information of the second branch is obtained as follows through the calculating formula of the lower limit $\hat{I}$ of the mutual information:

$$\hat{I}(X_{2,m}; Y) = \log\left(\sum S_2 e^{u_{2,m}-u_{2,max}}\right) + u_{2,max} - \log\left(\sum S_2\right) - \frac{\sum(u_{2,avg} \cdot S_2)}{\sum S_2},$$

wherein $S_2 = 1 - \overline{S_2}$, $\overline{S_2}$ is a diagonal matrix of $H_2 \cdot H_2$, a matrix $U_2 = X_{2,m} \cdot Y$, $u_{2,m}$ is an element in $U_2$, $U_{2,max}$ is a maximum value of each element in $U_2$, $u_{2,avg}$ is an average value of each element in $U_2$, wherein let $I(X_{2,m};Y) = \hat{I}(X_{2,m};Y)$, then the mutual information $I(X_2;Y)$ of the second branch is obtained according to D channels of the second branch:

$$I(X_2; Y) = \frac{1}{D}\sum_{m=1}^{D} I(X_{2,m}; Y).$$

6. The adaptive multi-sensor data fusion system based on mutual information of claim 5, wherein a specific implementation process of the preprocessing module is as follows:

projecting the point cloud data onto a pixel plane using a conversion matrix of an LIDAR coordinate system and a camera imaging coordinate system, to obtain two-dimensional point cloud data corresponding to a gray-scale image; and performing interpolation operation on the two-dimensional point cloud data to obtain the dense point cloud data.

7. The adaptive multi-sensor data fusion system based on mutual information of claim 6, wherein the system further comprises a time series data adaptive adjustment module; and a specific implementation process of the time series data adaptive adjustment module is as follows:

calculating normalized mutual information between a current frame of the RGB image and a previous frame of the RGB image, wherein when the normalized mutual information is greater than 0.5, a timing requirement is satisfied, and the fusion network obtains the expected feature according to the previous frame of the RGB image and a previous frame of the dense point cloud data, calculates the mutual information of the first branch according to a first feature tensor and an expected feature of the current frame of the RGB image, calculates the mutual information of the second branch according to a second feature tensor and an expected feature of a current frame of the dense point cloud data, reassigns the fusion weights according to a principle that a ratio of different branch fusion weights is proportional to a ratio of mutual information, and outputs the data fusion results and records the expected feature of the current frame; otherwise, the fusion weights are not reassigned.

\* \* \* \* \*